Nov. 17, 1953  A. C. PETERSON  2,659,550
CONVERTIBLE ROTARY WING AIRCRAFT
Filed June 12, 1950  4 Sheets-Sheet 1
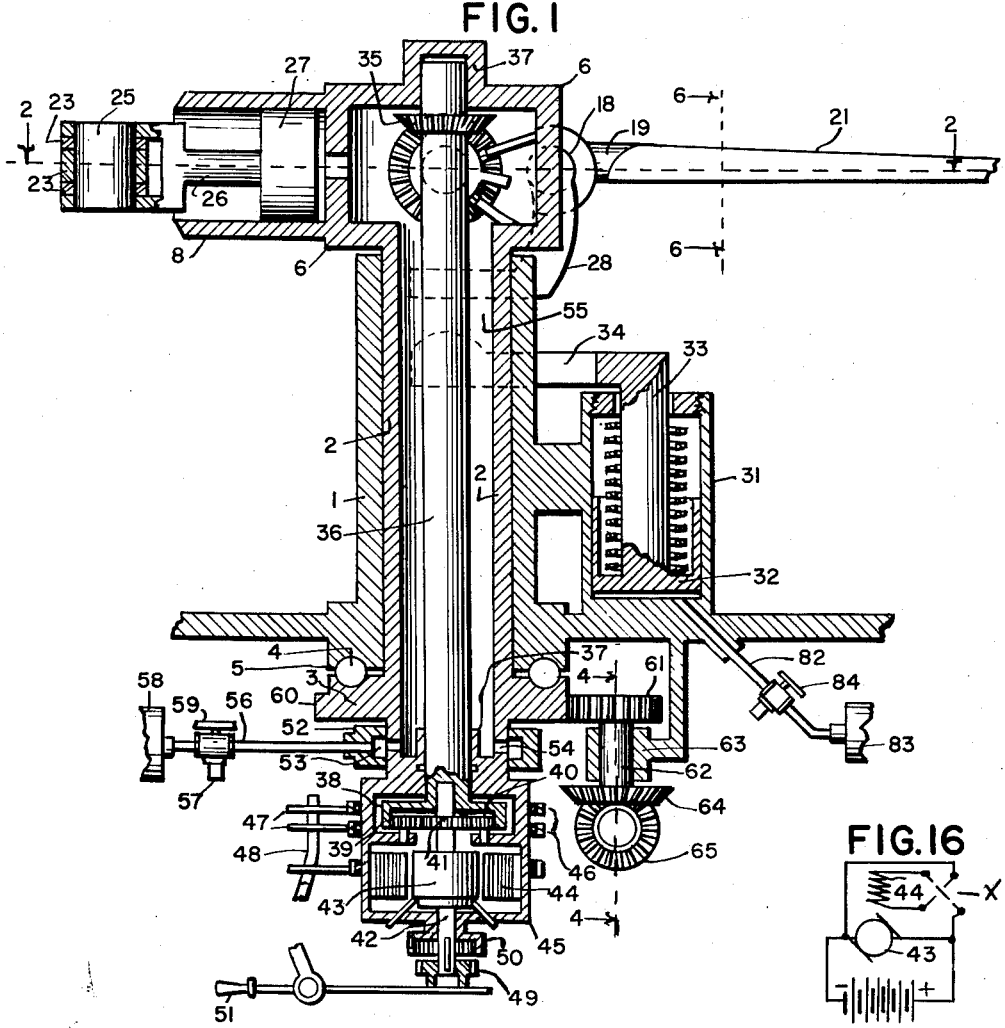
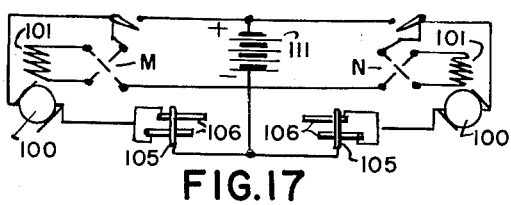
INVENTOR
Adolph C. Peterson Nov. 17, 1953
A. C. PETERSON
2,659,550
CONVERTIBLE ROTARY WING AIRCRAFT
Filed June 12, 1950
4 Sheets-Sheet 2
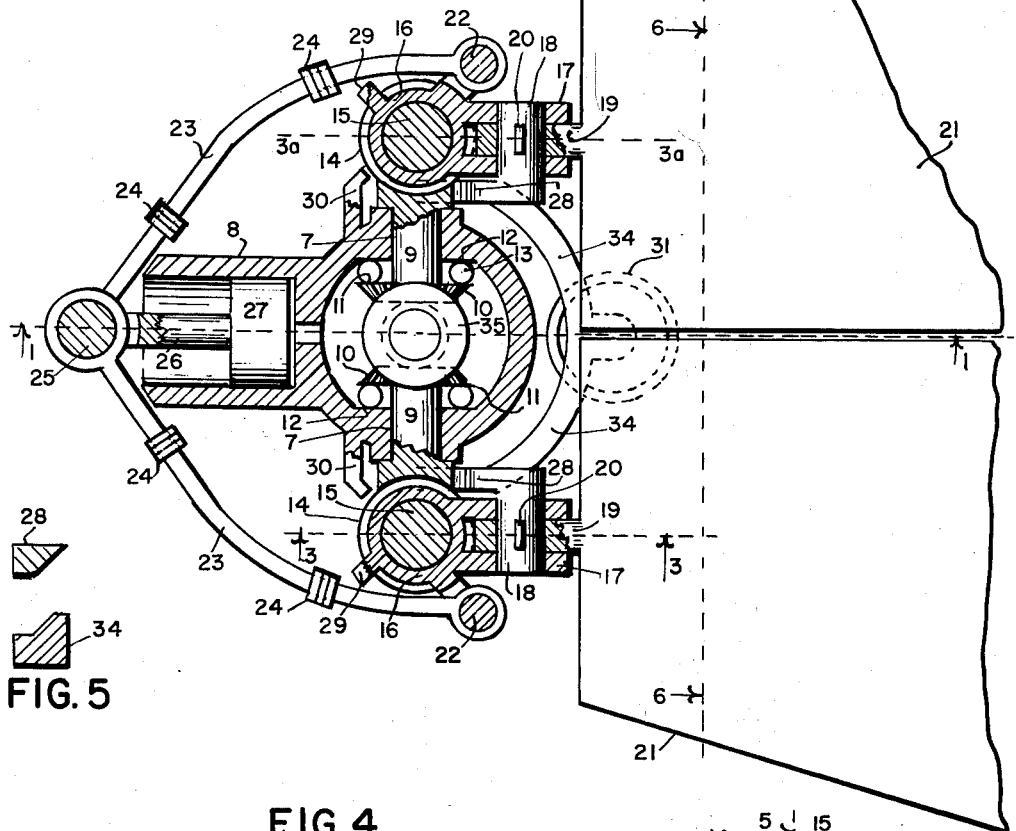
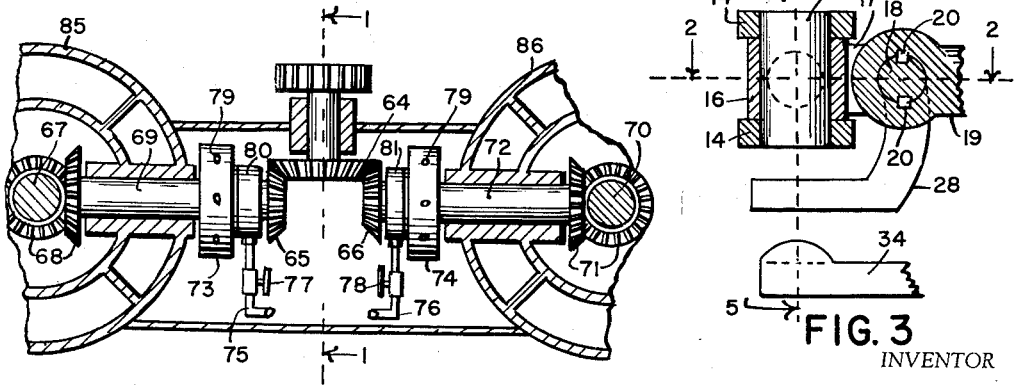
INVENTOR
Adolph C. Peterson.

Nov. 17, 1953  A. C. PETERSON  2,659,550
CONVERTIBLE ROTARY WING AIRCRAFT
Filed June 12, 1950  4 Sheets-Sheet 3
FIG. 8
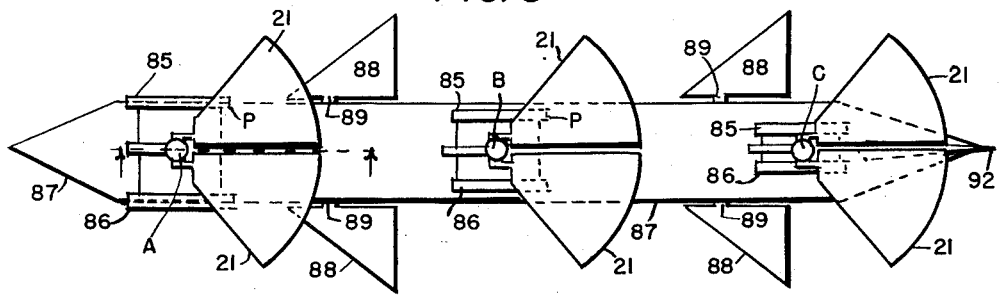
FIG. 9
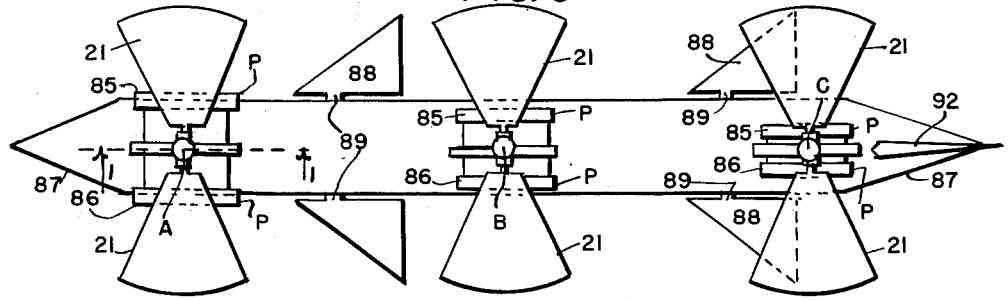
FIG. 10
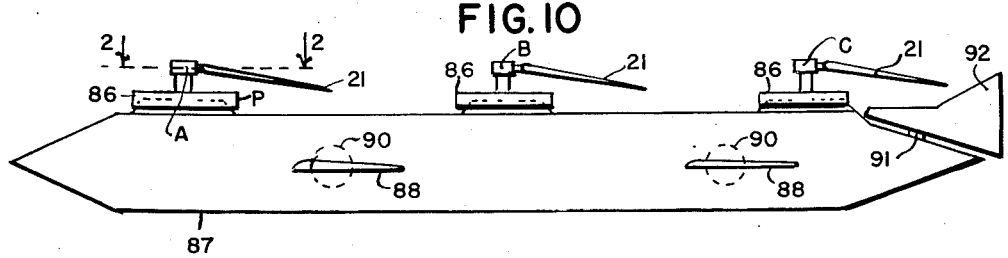
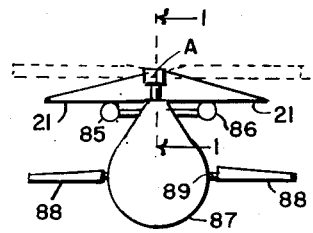
FIG. 11
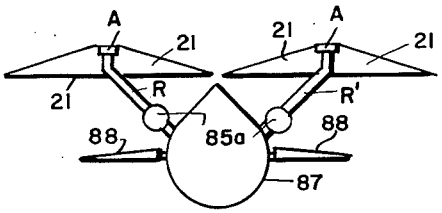
FIG. 12
INVENTOR
Adolph Peterson.

Nov. 17, 1953     A. C. PETERSON     2,659,550
CONVERTIBLE ROTARY WING AIRCRAFT
Filed June 12, 1950     4 Sheets-Sheet 4
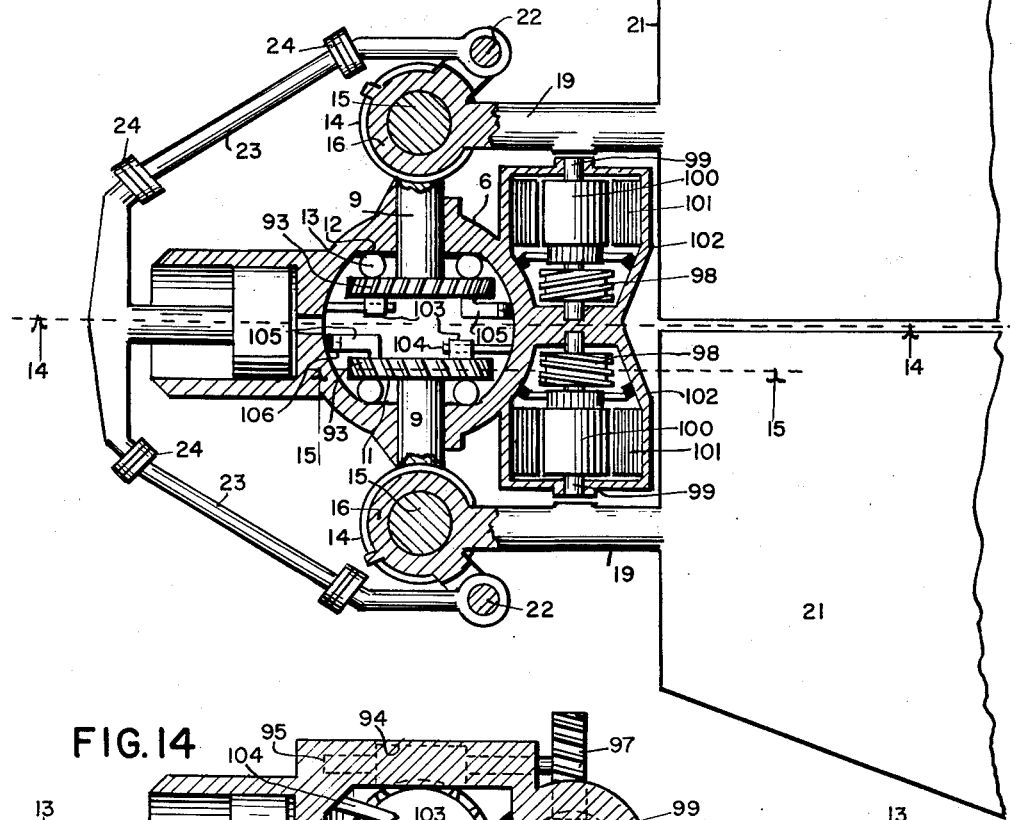
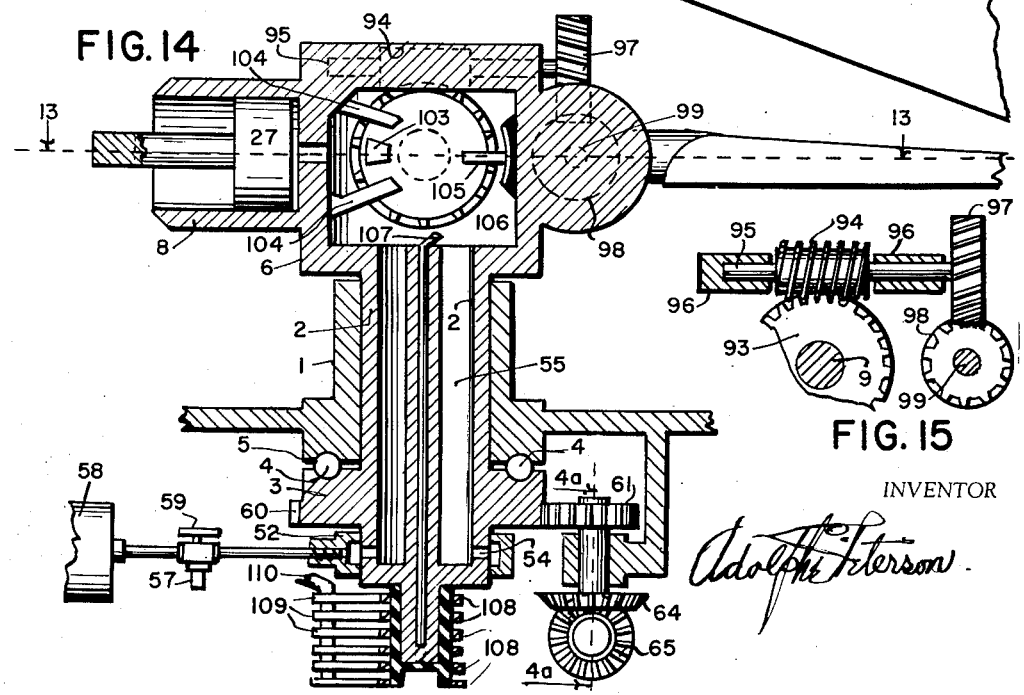
INVENTOR
Adolph C. Peterson Patented Nov. 17, 1953

2,659,550

UNITED STATES PATENT OFFICE 2,659,550

CONVERTIBLE ROTARY WING AIRCRAFT

Adolphe C. Peterson, Edina, Minn.

Application June 12, 1950, Serial No. 167,608

8 Claims. (Cl. 244—7)

My invention relates to air-craft and particularly to a form of aircraft and means which provides for convertibility of the wing structure for different methods of flight, wherefore it is called, convertible rotary wing air-craft.

The chief objects of my invention are to provide an air-craft which will have the advantages of the rotary wing air-craft or helicopter type of air-craft, while obviating the disadvantages of the helicopter type of air-craft and having the advantages of the fixed wing type of air-craft, and which will provide by its structure for flight as a rotary wing air-craft and for such conversion in flight that it may fly as a fixed wing type of air-craft. An object is to provide means whereby the same structure which provides means for rotary wing flight will also provide means for fixed wing flight. An object is to provide such a type of rotary wing means and control means and conversion means therefore that the rotary wing means will substantially provide sustentation for the air-craft as a fixed wing type of air-craft having the characteristics of the swept wing type of aircraft and providing thereby the form of fixed wing which is especially adapted for very high speed flight, such flight as is near sonic speed or even above that speed. An object is especially to provide such means as designated which may be used for commercial purposes as passenger carrying or freight carrying air-craft at high speed, and also to provide such means for use of army or navy for war or defense purposes, especially for the use of the air-craft with water borne ships as a base which do not or need not have the large flight deck or landing decks of the commonly known carrier type of war-ship. In general the object is to improve upon air-craft, their structure and operation, and especially to provide for such air-craft with lesser expense of construction, and greater adaptability in use.

The principal devices and combinations of devices comprising my invention, are as hereinafter described and as defined in the claims. In the accompanying drawings which illustrate my invention in several different forms, like characters refer to like parts in the views, in so far as practicable. Referring to the drawings:

Figures 1, 2, 3, 4, 5, 6, 7, illustrate one form of the unit which constitutes my invention, and which may be applied in different ways or in any number of units to an air-craft for use thereon. Of these figures: Figure 1 is a view in vertical section through the axis of the principal operating elements of my device, some parts being broken away, some parts being shown in full vertical elevation, the section being on the lines 1—1 of Figures 2 and 4. Figure 1 shows in particular a pylon bearing my device mounted thereon, only a small portion of one of the two wings being shown in this view. A section on lines 1—1, Figs. 8, 9, 11 is similar. Figure 2 is a view chiefly in horizontal section through the wing mounting means, the two wings being broken away near their roots, this section being on the lines 2—2 of Figures 1 and 3, and 2—2 of Fig. 10. Figure 3 is a detail view chiefly in vertical section on the line 3—3 of Figure 2 showing principally a lever arm of the associated wing and a portion of an engaging or thrusting element associated therewith. A section on the line 3ª—3ª of Figure 2 would be similar and is therefore not shown. Figure 4 is a vertical section at right angles to the section of Figure 1, on the line 4—4 of Figure 1, this section being a detail section through the axes of shafts and means driving the air-craft and adapted for driving the wing means during periods when drive of the wing means is needed. Figure 5 is a detail section on the line 5—5 of Figure 3, but showing only the lever arm and the engaging or thrusting element in section. Figures 6 and 7 are merely different sections of forms of blades or rotary wings which are commonly used and either of which may be used in my device, the sections being on the lines 6—6 of Figures 1 and 2. Figures 8, 9, 10, 11 show an air-craft having three units such as the unit described and shown as Figures 1 to 7, inclusive, these three units being mounted on the air-craft, as A, B, C. Of the figures showing the air-craft, Figure 8 is a plan view, Figure 9 another plan view, Figure 10 a side elevation, Figure 11 a frontal view. Figure 8 shows the wings of each unit in the fixed or static positions, that is the position for high speed, forward flight, substantially in the horizontal direction. Figure 9 shows the wings of each unit in the relative positions for rotation, that is for climbing or descending of the air-craft in slow speed flight, or for landing or take-off, or whenever the rotating condition of sustentation for the air-craft is desired. Figure 12 shows a frontal view of an air-craft on which the unit may be mounted, this view showing the units mounted on a pair or pairs of booms or supports one on each side of the air-craft fuselage. Either of the two types of my unit shown may be mounted as shown in any of the Figures 8 to 12, inclusive. Figures 13, 14, 15 show the second or modified form of my unit, embodying a modified form of the structure changing form for the rotary wing means that is the means whereby the wing means may be used as a rotary wing means or as a fixed or static wing means. Figure 13 is a section on a horizontal plane transversely of the axis of the wing means, on the line 13—13 of Figure 14, the wings being broken away. Figure 14 is a vertical section on a plane at right angles to the section of Figure 13, this section being on the line 14—14 of Figure 13. Figure 15 is a detail section on the line 15—15 of Figure 13, some parts being in side elevation, one train of wing actuating gear for oscillating of the wing pivot being shown. A similar section through the other actuating gear of the unit would be similar and is therefore not shown, except as in Figures 13 and 14.

One unit embodying my invention, and in the form shown in Figures 1 to 7 both inclusive, is now described, and reference is now made to these figures for description, as follows.

A pylon 1, Figure 1, is shown only in such part as necessary to show the mounting of the means therein. That mounting consists chiefly of a rotor shaft 2 of tubular form, a flanged member 3 formed on or fixed on the lower end of the rotor shaft 2 and bearing by means of a ball or roller bearing 4 against the lower face of the pylon bearing 5 and thereby providing for upward thrust of the rotor shaft 2 against pylon 1; and a cylindrical rotor head 6 formed on or fixed on the extreme upper end of the rotor shaft 2. The rotor head 6 has two diametrically opposite rotor wing or rotor foil bearings, each denoted 7, formed therein and also in the same horizontal plane transversely of the rotor head and formed with or fixed therewith, a cylinder 8 which is at its nearest end closed by the material of the rotor head and is open at its outermost end, that is the end most remote from the axis of the rotor shaft 2.

Each of the rotor foil bearings 7 has mounted therein to be oscillable on a horizontal axis in the rotor head, an air foil mounting pivot or shaft 9, each of which has fixed or made on its innermost end a mitre gear member 10, which extends laterally about the shaft 9 and forms also on its exterior face a bearing face 11 by which the mitre gear and the air foil pivot 9 may bear outwardly from the rotor shaft axis against the one of the two bearing faces 12 which are formed in the rotor head 6, with ball bearing 13 between each bearing face 11 and its associated bearing face 12. Thereby the two air foil mounting pivots 9 are mounted so each may resist radially outward pull on it and so that each may be easily oscillated on its axis, in the rotor head 6. Each pivot 9 has formed in its radially outermost end, exteriorly of the rotor head 6 a bifurcated bearing 14 by which a pivot pin 15 is fixed, and each of the two pivot pins 15 has oscillably mounted on it the annular strap member 16 so that the latter members may, as shown in the drawings, oscillate on a vertical bearing, the one of the pivot pins 15 in its associated air foil mounting pivot or shaft 9. Each annular strap member 16 has formed therewith the pair of bearing brackets 17 in each of which there is oscillable the bearing pin 18 by which an air foil spar member 19 is anchored but tightly keyed thereto by the keys 20 and corresponding key ways formed between the bearing pin 18 and the spar member 19. The latter members 19 may thereby swing in the vertical plane, as the parts are shown in the drawings, by means of their bearing pins 18 in their bearing brackets 17, and the air foils or wings or blades 21 as they may variously be called, may thereby swing or oscillate in the vertical plane by means of this mounting.

All of the parts which have been described and any of the parts in the structure may be formed or constructed in as many sections as may be found necessary to readily manufacture the devices and procure their assemblage in the device, as described. The views are formed in such manner as to most adequately show the relative operation of the means. Each of the two air foils 21 are formed either as one integral member with the spar member 19, of metal such as steel or aluminum or magnesium or some alloy or plastic or wood, according to the desired construction, and is formed of such parts as may be deemed necessary or as one forging or casting, as may be desired, and in the manner in which rotor blades or air-craft wings are constructed to provide the greatest strength in proportion to weight, and to provide sufficient rigidity in the air foil throughout its length or that degree of flexibility which is deemed conducive to strength and in general maintenance of its form in high speed flight and under the stress of pressure of the atmospheric air against the surfaces of the members. Each air foil 21, which has the form more fully shown in the views of the aircraft, as above briefly designated, and in the position, as shown in the views Figures 1 to 7, extends substantially horizontally, on its under surface, rearwardly from the axis of the rotor shaft 2, that is, rightwardly in Figures 1 and 2, and each may be of a length comparable to the other proportions of the structure, and that may be say from twenty to fifty feet, or even more or less. Each air foil 21, when in the position shown in Figures 1 and 2, has a section approximately that of a swept wing, from front to rear end, and this section left to rightwardly, Figures 1 and 2, approximates that of the usual air-craft sustentation wing or air foil, so that when the air foil is in the position shown in Figures 1 and 2, that is the fixed or static wing position, that is with respect to the flight direction, it will efficiently provide the sustentation lift, as an air-craft wing customarily does, and it may have any such form as will most adequately perform that duty, when the air foil is in that position. Each air foil has a section, transversely of it, which may be such as either of the forms of section shown in Figures 6 and 7, that is such as the form of a rotary wing blade, or any form of section such as will provide most efficient sustentation or lift effect, when the air foil is with its associate rotating about their common axis, in the horizontal plane, that is the axis of rotor shaft 2, but this form will be such that the air foils, when given the proper angle of incidence, as hereinafter described, will, rotating as they then will as a unit and in the same direction of rotation about the axis of rotor shaft 2, provide the most efficient sustentation or lift for the air-craft on which mounted, as a rotary wing structure. As the air foils 21 are shown in Figures 1, 2, and 6, 7, they extend generally horizontally rearwardly and also lie generally horizontally in that horizontal plane.

Each strap member 16, which secures an air foil 21, has formed or fixed on it a bracket 22 by which the adjacent end of a connecting rod 23, one for each air foil 21, is flexibly mounted on it and securely atttached to it, eccentrically of the axis of the associated pivot pin 15. Each of the connecting rods 23 has a pair of flexible couplings or joints 24 in it and at its forward end, each is flexibly mounted on a common pin member 25 formed in the end of a piston rod 26 most remote from the axis of rotor shaft 2. The piston rod 26 is formed with a piston 27 which is a pressure responsive member, and is reciprocably mounted by a close fit, but slidable fit, in the bore of the cylinder 8, so that, as the piston 27 slides toward or away from the axis of rotor shaft 2, it will, in one movement, away from that axis, by means of connecting rods 23, pull brackets 22, and thereby exert a pull on the associated strap members 16, eccentrically of their axes, so as to thereby pull and swing the associated air foils 21 about the axes of their associated pivot pins 15, in the horizontal plane, as shown, so that the air foils 21 may thereby be swung individually into positions extending radially away from the axis of rotor shaft 2 these positions being positions diametrically opposite and on opposite sides of the axis of rotor shaft 2. These positions, which constitute the rotor wing positions and rotor wing condition, are shown in Fig. 9, of an air-craft, as hereafter described. When the piston 27 slides into the cylinder 8, toward the axis of rotor shaft 2, the air foils 21, will, in flight, as hereafter described, take the positions shown in Figures 1 and 2, and in these positions, the air foils 21 will lie in the same plane and with the adjacent longitudinal edges of the foils as close together, as the construction will permit.

Each bearing pin 18 has formed with it or firmly secured with it a lever arm 28, each of which has the form more particularly shown in Figure 3, and this lever arm extends at right angles away from the axis of the bearing pin 18 and is of such length and strength that it may be given the thrust against it, as hereafter described, to swing the bearing pin 18, associated, on its axis, in its bearing bracket 17, and swing with it about that axis, the associated air foil 21. Each air foil 21 is thereby swung by this associated lever arm 28, so that the air foil 21 may be forced into the position for fixed wing sustentation, this being a position such that the air foil, as it recedes from the axis of rotor shaft 2, inclines downwardly from the plane of that axis, and the pair of air foils 21 may thereby be forced into the position of incidence which will give sustentation or upward lift to the structure, in high speed forward flight of the air-craft to which the unit is fixed.

Each strap member 16 has fixed on it a stop or lug 29 which when the air foil is swung into its rotary wing position, will abut against either one of the two stops or lugs 30 fixed on rotor head 6, and thereby limit the movement of the air foils, so that they are held in their rotary wing positions.

There is fixed on the rearward side of the pylon 1, or formed with it, a cylinder 31, which has reciprocable within it, the pressure responsive piston 32 so that pressure of fluid under the piston 32 in cylinder 31 will force the piston upwardly and move with it, upwardly a piston rod 33 which has formed with it or fixed on it, a horizontal forked arm or lever 34, and the latter, as it is moved upwardly, when the air foils are in the relative positions shown, Figures 1–2, contact the pair of lever arms 28 and force the latter upwardly and thereby force the pair of air foils 21 to swing downwardly, from the horizontal positions, about their axes in bearing pins 18, into the positions of wing incidence for forward flight as static wing means. Each of the lever arms has the inclined side as shown in Figure 5 and each side of the forked lever 34 has the form shown in Figure 5, so that, these inclines being oppositely on the opposite sides of the axis of rotor shaft 2, the form of lever arms 28 and forked lever 34, will tend to lock the pair of air foils 21 in the positions shown in Figures 1, 2 with respect to the direction of flight of the air-craft. Any locking means may be used in lieu of this inclined form shown of arms 28, 34, or the forked ends of forked lever 34, in the horizontal direction, transversely of the axis of rotor shaft 2, may have such wide breadth, that any swinging of the air foils 21 in the horizontal plane about the axis of rotor shaft 2, will not cause loss of contact, when the air-craft moves in the condition of fixed wing flight.

The two mitre gears 10 are in permanent engagement with the common mitre gear 35 which is fixed securely on the upper end of the incidence control shaft 36, which is mounted in rotor shaft 2, axially thereof. The incidence control shaft 36 is rotatable in bearings 37 formed in the rotor shaft 2 and rotor head 6, and at its lower end the control shaft 36 has formed therewith or mounted thereon the gear drum 38 and the latter has internally thereof the internal spur gear 39. In engagement with the latter are a pair of spur gears 40 which in turn are in engagement with the small pinion 41. The latter is fixed on the armature shaft 42 which has armature 43 mounted thereon and the latter is rotatable within the field magnets 44 which are fixed in the larger drum 45 which is in turn fixed on the lower end of the rotor shaft 2 below the flanged member 3, there being however a space interposed. The drum 45 has on its exterior surface three of insulated annular contact rings with which three of contact springs or bars are in contact, the rings being denoted 46 and the bars 47. The bars 47 are held in the fixed bracket member 48, which latter is mounted with the pylon 1 in any manner. The armature shaft 42 has on its extreme lower end, secured to rotate therewith but be slidable thereon by means of key means, a small spur gear clutch 49 which may be pushed upwardly on armature shaft 42 into engagement with an internal gear in a small drum 50 fixed on the lower end of the drum 45, so that when clutch 49 is moved upwardly by hand lever 51 the armature shaft 42 may be clutched together with the rotor shaft 2, and thus the control shaft 36 may be locked with rotor shaft 2, and the control shaft 36 and air foils 21 locked against change of their incidence, when they are in the rotor wing condition.

A bearing 52 having an annular passage 53 fits over the rotor shaft 2 intermediately of the drum 45 and flanged member 3 and rotor shaft 2 is rotatable within it, but has ports 54 formed in its sides in alignment with passage 53 so that air or fluid as oil may pass into the interior bore 55 of rotor shaft 2 from conduit 56, or conversely may pass from bore 55 by way of conduit 56 to a release pipe 57. The conduit 56 delivers fluid under pressure, as air or oil, from reservoir 58, according to the position of hand valve 59, whereby the fluid may be directed to or from bore 55, as the pilot may desire.

The flanged member 3 has formed annularly of it a spur gear 60 which is in permanent engagement with a smaller spur gear 61, and the latter is fixed on the upper end of drive shaft 62 rotatable in bearing 63. Drive shaft 62 on its opposite end has fixed thereon the mitre gear 64 which is in permanent engagement with the air of mitre gears 65—66, one of which may be driven by a turbine shaft 67 by means of mitre gears 68 through transverse shaft 69 and the other of which may be driven by a turbine shaft 70 by means of mitre gears 71 and transverse shaft 72. Each of shafts 69 and 72 has interposed in it a gradually engageable clutch means 73 and 74, respectively, each of which may be a fluid clutch or other type clutch (such as a magnetic clutch), and the fluid clutches may receive a liquid internally therein, by means of conduits 75, 76, as controlled by hand valves 77, 78, from any source of liquid under pressure, and either of the fluid clutches may slowly release the liquid by means of release ports 79 in each clutch 73 and 74. The liquid is received to the clutch means by means of bearing delivery means mounted thereon, designated 80, 81, the clutches being rotatable within. The fluid clutch means shown is only diagrammatically shown, since any type of clutch means may be used, and especially any type of fluid clutching means, such as are commonly known. The clutching means should however be such a means that the driving shafts are engaged without shock which would be injurious.

The cylinder 31 has delivering to or away therefrom a conduit 82 which may receive air or liquid under pressure from any pressure reservoir or supply means 83 according to the position of the hand valve 84 which in one position will permit flow of fluid under pressure from reservoir 83 and in the other position will block flow from reservoir 83 and permit release of fluid from cylinder 31. The hand valve 59 is also a similar two way valve which will similarly block flow or release fluid, that is from bore 55.

The turbine shafts 67 and 70, respectively, are the power shafts of turbines 85 and 86, respectively, and the latter are any kind of turbine power plant or turbine jet propulsion means, each providing not only forward propulsion power for the air-craft by the ejection of exhaust gases from their jet tubes, but providing also for power delivery by means of the transverse shafts 72 and 69, whenever the clutches 73 and 74 or either of them are engaged. It is contemplated that each of the turbines 85 and 86 will have the fuel supply means and control means therefor and the air compression and flow means and combustion means as such turbines usually have, the turbines being illustrated diagrammatically or in part only, merely to show their association as power delivering and forward propulsion jet means, with the wing means as described. Each turbine may by its fuel control means deliver more or less power as needed for operation of the wing means as rotary wing units and for forward thrust for forward propulsion of the air-craft. The wing means as described will ordinarily be used only for a few minutes at a time, so the turbines 85, 86 may be caused to deliver increased power for such short periods, when necessary. It is contemplated that the turbine means, or any power plants used in lieu thereof may propel the air-craft with which the unit is associated, in any of the well known methods, as by propeller means for forward propulsion, the jet propulsion means being preferred with installation of the wing unit described, since the unit is especially adapted for high speed air-craft.

Referring to Figures 8, 9, 10, 11, it will be noted that the air-craft shown, has mounted thereon three of the units, such as have been above described, and these units are designated A, B, C. Each of these units has the means as above described in connection with Figures 1 to 7, and each has specifically the two air foils 21 and 21, and each has the two turbine power plants 85 and 86, and each has its individual control means as was above described. The air-craft has also, mounted on the sides of its fuselage 87, four swept wings each denoted 88, each of which is mounted by means of an oscillable pivot means 89, and each of which may be oscillated for variable incidence of the wing by means of independent power and control means 90, the latter being diagrammatically shown only. These swept wings 88 may be called auxiliary wings and they serve somewhat as aelerons or flaps in airplanes, to provide the pilot with vertical directional means as well as supplementary sustentation means when that is required. They are ordinarily, in high sped flight maintained approximately in horizontal positions, so that they will interpose little obstruction to forward flight. The aircraft has also mounted on a vertical rudder shaft 91 the vertical rudder 92 which may be used to guide the air-craft in the horizontal plane. Any other supplementary guiding and control means may be used.

In the use and operation of my device, the air-craft may be caused to take off as air-planes customarily do if the air-foils of units A, B, C, are in the positions shown in Figure 8. In that case if the take-off is from land any of the customary land wheel means may be used with the air-craft such means not being shown. Or the air-craft may take off from sea, the fuselage being formed as a hull or in any manner to permit such take-off. Preferably, however, the take-off will be with use of the air foils of units A, B, C, as rotary wing units. Assuming the air-craft will so take-off, the pilot, having caused turbines 85, 86 to deliver power torque to transverse shafts 69, 72, will see that hand valve 84 is turned to prevent delivery of fluid under pressure to cylinder 31 and release pressure therefrom so that the forked lever 34 is lowered, and he then turns hand valve 59 to the position such that fluid under pressure will flow to bore 55 to rotor shaft 2, and thereupon the cylinder 8 will fill with fluid under high pressure behind the piston 27 and the latter will be thrust outwardly and pull the bracket or crank elements 22 to pull the air foils 21 into the positions diametrically opposite each other and extending radially diametrically oppositely from the axis of rotor shaft 2, so that these air foils 21 will be in the positions relatively, as shown in the plan view Fig. 9 of the air-craft. The air foils of each unit A, B, C, are caused to be so extended. The pilot may now cause the clutches 73—74, to be engaged, and increase the power of turbines 85, 86, whereupon the air foils of each unit will be turned as rotary wing units. The pilot will now by means of reversing switch X, Fig. 16, cause electric current to flow in the direction, appropriate, through the fields of the electric-motor 43—44, so as to cause this motor means to cause rotation of control shaft 36 relative to rotor shaft 2, and this relative rotation causes the air-foils to assume the proper angle of inclination to the horizontal or incidence, which will provide upward lift for the air-craft, the current being caused by switch X to flow in the proper direction to cause this incidence for upward lift. Having secured this proper angle of incidence, the pilot may lock the air foils in this position of incidence by lever 51 and clutch means 49—50 which locks shaft 36 to rotor shaft 2. The air craft will now start to climb upwardly and at the same time be propelled forwardly by propulsion thrust forwardly of the air craft by means of the turbine jets P, although the forward thrust will not cause high forward speed due to the rotary wing positions of the air foils of the units A, B, C, and also due to the absorption of power in driving of the air-craft units A, B, C.

Having attained sufficient altitude for normal flight, the pilot may now cause the units A, B, C, to assume the swept wing fixed wing positions, but this is preferably accomplished one unit at a time, and preferably the pilot will cause the auxiliary wing elements 88 to be placed in lift positions by means of their individual control means 90. He may first cause the forward pair of auxiliary wings to assume high lift positions. The air-craft will now have a considerable forward speed, say one to two hundred miles per hour, as it has been gaining speed as elevation is attained, and the pilot may now cause unit A to fold its wings to the static position. To accomplish this he first releases the clutches 73—74 thereby driving torque on the unit A ceases; and he thereupon by means of switch X causes the electric motor 43—44 to place air foils 21 in the horizontal position, that is without angle of incidence for rotary wing lift; he thereupon releases fluid pressure from the bore 55 of rotor shaft 2 by means of hand valve 59 and thereupon the piston 27 recedes, the pressure of atmospheric air upon the air foils causes them to move in unison to a position trailing from the axis of rotor shaft 2 so that they occupy the positions shown in Fig. 8, the swept wing position; and he thereupon turns hand valve 84 to cause fluid under pressure to fill cylinder 31 under piston 32 so that forked lever 34 is caused to contact lever arms 28 of the two air foils 21 and force these lever arms 28 upwardly so that the air foils 21 are caused to be depressed at their rearmost ends and to assume an angle of incidence for upward lift as shown in Figure 10. The air foils 21 of the unit A are now locked in the static wing positions with an angle of attack with respect to atmospheric air, so that upward lift is provided by the air-foils 21 of the unit. The pilot may now similarly cause unit B to fold its air foils in the rearward trailing position and depressed to have the proper angle of incidence for upward lift. Having caused unit B to assume this static wing position, he similarly causes unit C to assume the static wing position and the proper angle of incidence, as shown in Fig. 11. He may when causing unit C to assume this position cause the rear pair of auxiliary wings to assume a high lift position of incidence by their control means 90. Having so caused all units A, B, C, to assume the static wing swept wing form for fixed wing forward flight, he may now adjust the turbine power to cause such forward speed as desired. In the condition changing or phase changing process, units A, B, C, which are in rotary wing condition, may be caused to rotate at higher speed than normal to momentarily provide increased lifting power.

When the pilot desires to cause the air craft to descend as when reaching an air port or a carrier, auxiliary wings 88 are caused to provide some sustentation power and the air-craft is somewhat slowed in speed, and the pilot then; in sequence; turns hand valve 84 to release fluid pressure from cylinder 31; thereby lowers forked arm 34 so the air foils of one unit, say unit A are unlocked and they take the horizontal position, trailing; turns hand valve 59 to close the release 57 and admit fluid under pressure to bore 55 of rotor shaft 2 so the piston 27 of the unit pulls the air foils 21 into the diametrically opposite rotary wing positions, as shown in Figure 9; then by switch X causes electric motor 43—44 to turn the air foils 21 into the rotary wing incidence; having so placed the air foils he causes them to be locked into these positions with the proper angle of attack on the air for rotary wing lift by means of lever 51 and clutch 49—50, engages clutches 73—74 so the turbines 85, 86 deliver driving torque to rotor shaft 2 to rotate the rotor shaft 2 with the air foils. The pilot then by the same sequence of control of units B and C causes them to assume the rotary wing positions of their air foils and causes these units to be rotated. Auxiliary wings may be left in high lift positions or inclinations for slowing forward movement of the air-craft and for providing additional upward lift. The pilot may then adjust the power output of the turbines 85, 86 to permit of that speed of the rotor units A, B, C, which will permit the air-craft to slowly descend. In this slow descent which may be say as low as ten or more miles per hour, the pilot may direct the air-craft into the wind by the vertical rudder, and the air-craft will automatically tend to take a position headed into the wind, but this direction of the air-craft may be assisted at any time by adjustment of the power output of the turbines and use of the vertical rudder as well as either the front auxiliary wings or the rear auxiliary wings or both.

It should be noted that the pilot may at any time change the angle of incidence of the air foils of any unit A, B, C, by releasing clutch 49—50 and use of the electric motor 43—44 of the unit to change the incidence of the air foils. In this connection, any type of indicating means or limit switches of control means such as is commonly known, may be used for indicating to the pilot or controlling the position of the air foils. In the static positions of the air foils 21 of units A, B, C, the maximum degree of angle of incidence or air attack procured by the contact and forcing or forked lever 34 against levers 28, is limited by the construction as shown in Figure 3, so that this maximum may not be exceeded. The cylinder 31 should have a high pressure of fluid therein to hold the air foils downward in the lift positions for fixed wing operation, and that pressure may be several thousand pounds, according to the construction, and the use of this fluid pressure may permit some automatic adjustment of the air foils in their incidence to the speed and the pressure of the atmospheric air against the air foils or wings, if that be desired, this being obtained by the construction and proportioning of parts and pressures or the control of the pressure in cylinder 31.

Referring now to the modified form of my means, as shown in Figures 13, 14, 15, this form is similar to the first form described in that the unit structure is such that the air foils 21 may be placed in the rotary wing positions, diametrically oppositely of rotor shaft 2, or in the static fixed wing positions as a swept wing, but this form differs in that a different type of means is utilized to accomplish the placing of the air foils in the different positions of incidence or air attack, for the rotary wing condition and the fixed wing condition of flight.

This form has the rotor shaft 2, the pylon 1, and the means whereby the rotor shaft 2 can give upward support to pylon 1 and the associated air-craft, namely the flanged head or bearing 3 at the lower end of rotor shaft 2 bearing upwardly by ball bearing 4 against the bearing 5 of the pylon 1, and flanged bearing 3 also has the large spur gear 60 thereon whereby it may be driven by means of the smaller spur gear 61 and the other means and clutches especially whereby driving torque is transmitted, when desired, from the turbines 85, 86, which are used with this form as in the first form described, but not specially shown, except by the one transverse shaft 69, and its mitre gear 65. The rotor shaft 2 has the head 6 and the cylinder 8 and piston 27 by which the connecting rods 23 are as in the first form pulled to thereby pull the crank arms 22 of the spar straps 16 or spars 19 to place the air foils 21, in their diametrically opposite or rotary wing positions, as in the first form.

The air foil mounting pivot or shaft 9 of each air foil 21 has a worm wheel 93 formed thereon and the latter has the bearing face 11 bearing outwardly against the associated bearing of the rotor head 6 to support the air foil against outward centrifugal pull in rotation. Each mounting pivot 9 has exteriorly of the rotor head 6 the associated bifurcated bearing 14 by which pivot pins 15 are fixed and on the latter the strap members 16 are mounted for oscillation of the air foils 21 in the horizontal plane, in the positions of the parts as shown in Figures 13, 14. The strap members 16 and the spars 19 of the air foils, in this form, are formed in one part or firmly united and do not have the bearing brackets 17 and bearing pins 18, interposed. In this form therefore, the air foils 21 may swing about their pivot pins 15 but do not have the supplemental swinging movement about the bearing pins 18.

Each of the two worm wheels 93 are in permanent engagement with associated worms 94, one for each worm wheel 93, and worms 94 are each mounted on shafts 95, one for each, and each shaft 95 is rotatably mounted in bearings 96 formed on the rotor head 6. Each worm shaft 95 has fixed on one of its ends, a worm wheel 97, one for each, and each worm wheel 97 is in permanent engagement with a smaller worm 98, one for each, and each of the latter is fixed on an electric armature shaft 99, one for each, and each of the latter has fixed thereon its armature 100, each of which is rotatable in its field magnet means or field means 101, the two field means being mounted and fixed in motor casings 102 which are formed with and rotate with the rotor head 6, when the latter rotates. By the means last described, each air foil mounting pivot or shaft 9, together with its associated air foil 21, may be turned, independently of the other air foil, about the axis of the mounting pivot 9, and each may be so turned, independently of the other, by the pilot, through the independent electric motors 100—101, 100—101, as the pilot determines, through the control means, as hereafter described.

Each worm wheel 93 has associated with it, fixed on it, a lug or stop 103, which may move as limited between lugs or stops 104 fixed in rotor head, interiorly thereof, there being two stops 104 for each worm wheel 93. Thus each worm wheel 93, and with it, its associated air foil 21, may have only the relative swinging or pivoting movement on its mounting pivot 9, in rotor head 6, as limited by these stops, but these movements are sufficient to permit of the variable incidence positions, as is herein described. Each worm wheel 93 has also, fixed on its face nearest the axis of rotor shaft 2, a connector contact 105 each of which makes contact between two associated limiting contacts 106, that is a pair of limiting contacts 106, for each connector contact 105. Thereby these limiting contacts which are included in at least one of the circuits of each electric motor 100—101, prescribe the amount of swinging movement for each mounting pivot 9 and its associated air foil 21, in each direction. These limiting contacts are shown in Figure 17. These limiting contacts are not necessarily included in the control means, that is the circuits of electric motors, 100—101 and 100—101, but they are preferably so included.

This form has the fluid pressure supply means 58 and the hand valve 59 and bearing collar 52 for introducing or discharging fluid under pressure from bore of rotor shaft 2. The cable means 107 passes downwardly through rotor shaft 2, centrally thereof and carries as many separate and insulated conductors, as are necessary to provide, the control of the motors 100—101 and 100—101, as hereinafter specified. These conductors end separately in insulated contact collars 108, six being shown, and each of the latter is in contact with sliding brushes 109, of which six are shown, Fig. 14. These brushes are mounted in and insulated from each other in the insulated mounting means 110 which is fixed in any manner in the interior of pylon 1 or the mounting of the latter. Each electric motor 100—101, may be so controlled by these contact brushes in association with the battery 111 or other current supply means, that current may be supplied to either electric motor means 100—101, for operation in either direction, independently of the other, as the pilot desires, for control of the angles of incidence of the air foils 21, as may be necessary for the different conditions of operation of the air-craft, as a rotary wing air craft or as a fixed wing air-craft.

The pilot may by either reverse switch means M or N, Figure 17, cause current to flow to drive the associated armature in either direction. For take-off, the pilot first places hand valve 59 to permit fluid under pressure to flow to bore 55 and thereby to cylinder 8 so air foils 21 are placed in the diametrically opposite positions, that is for rotary wing flight. He may then by means of reversing switches M and N, cause the associated motor 100—101, 100—101, to independently turn in the directions (opposite directions as to shafts 9), so as to cause mounting pivots or shafts 9 with air foils 21 to be placed in the angles of incidence necessary for rotary wing action, that is each air-foil 21 will have the same angle of attack on the atmospheric air in the rotation of air foils 21 with rotor head 6 so as air foils 21 rotate, which will be in the same direction, they each exert lifting effect on rotor shaft 2. The angles of incidence may be as much as necessary, and such as commonly used for maximum lift effect in rotor blades in rotors which do not have cyclic pitch changing, as in helicopters.

The pilot may now cause turbines 85—86 to deliver driving torque to rotor shaft 2 by engaging clutches 73—74, rotor shaft 2 and head 6, with air foils 21 now rotate as a unit, and by increasing turbine power the pilot may cause such lift to be exerted as will cause the associated air-craft to climb upwardly, the air-craft being now also forwardly propelled by the thrust of the turbine jets. After the air-craft has climbed to an appropriate elevation, the pilot may then, to procure fixed wing flight, in sequence; disengage the clutches 73—74 and give the necessary angles of incidence to auxiliary wings 88 as in the first form described; place the air foils 21 in the horizontal positions, as to blade or wing incidence for rotary flight; turn hand valve 59 to permit fluid to discharge from bore 55 and bar passage of fluid to said bore; thus permitting air foils 21 to swing on their pivot pins 15 to the positions trailing from the axis of rotor shaft 2, the atmospheric air stream causing this trailing as the air-craft has considerable forward speed by this time; cause electric current to flow to electric motors 100—101, 100—101, to cause the mounting pivots 9 to be turned in the same direction on their co-incidental axis, that is so that the two air foils 21 are co-incidently and jointly depressed about the mounting pivots 9, so that the rear ends of both air-foils 21 are forced downwardly, the air foils 21 being then in the trailing positions, as shown in Figure 13. In this depressed fixed wing position, the air foils are in their cross sections, transversely of the wings, in the relative horizontal positions, as shown in the cross-sections, Figure 6 or Figure 7, but they have a downward tilt from the rotor head 6, so that they thereby have the correct angle of incidence for fixed wing flight trailing from the rotor head 6 rearwardly of the air-craft in flight. In this condition, the air foils appear from the side of the air-craft, relatively, as in Figure 10, showing the side views of the air foils as swept fixed wings.

In this condition, forward flight, at high speed, say near sonic speed or even higher than that, or such high speed flight as is permitted by the construction. When the pilot desires, he may procure descent or landing condition, by in sequence; causing motors 100—101, 100—101, to place air foils 21 in trailing horizontal positions; causing fluid to flow to bore 55 and cylinder 8 to place air foils 21 in rotary flight positions diametrically oppositely, as in Figure 9; placing reversing switches M and N independently to cause the mounting pivots 9 to turn or swing in the opposite directions until the proper angle of incidence of each air foil 21, for rotary wing flight of the rotor shaft 2, is secured; engaging the clutches 73—74 so that turbines 85, 86 deliver driving power to the rotor shaft 2 and thus to air foils 21 so that they then rotate as a unit. The air-craft may then be permitted to descend and with comparatively slow forward flight, he may land the air-craft.

It should be noted that the auxiliary wings may be used to slow forward movement of the air craft by giving them an excessive angle of incidence by their control means 90, or that any other means may be used for decreasing forward speed, if that be found desirable. The delivery of power by the turbines 85—86 to the rotor shafts 2 of units A, B, C, will diminish the forward thrust of the jets from jet tubes P, thus also slowing the forward travel of the air-craft.

With either form of my means, the units A, B, C, may be caused to operate auto-rotatively, as by gyro-rotors, by causing the incidence control and operating means to give to the air foils the proper angles of incidence for such auto-rotation of the rotor shafts 2 with their air foils as in gyro-planes, and the air-craft may land with such auto-rotation. In connection with the incidence changing means for the air-foils I have shown limiting stops and also limiting contacts, but it is contemplated that there may be used in connection with the incidence changing means any type of known indicating means such as are commonly used in connection with machinery and movable equipment of any kind to indicate to the pilot in control, the degree of movement of mounting pivots 9 and their associated air foils 21. In connection with the second form shown, two limiting means are shown, either of which may be used without the other to limit the extreme of movements, but the pilot may by observation of the air foils 21 and also by timing of the movements of the control motors determine the angles of incidence or the positions of the air foils.

In the process of change from either condition to the other, rotary wing or fixed wing, the pilot may use such sequence of control as for the particular condition or air-craft will best secure the change. In general in air-craft, several or a number of the units described will be used, but the device or unit described, may be used in aircraft such as fighter air-craft, singly or in multiple, since in that type of air-craft, the pilot will be especially skillful in the use of his aircraft. Where, as shown in Figures 8, 9, 10, 11, or 12, a multiple number of stations, from front to rear of an air-craft, are used for mountings of the units either singly or in pairs, the distance from unit to unit, longitudinally of the air-craft, will be considerable, and will usually be at least forty to fifty feet, and in large constructions, even more than that, and this considerable distance is such, that neither wing units in swept fixed wing flight will interfere with each other, nor will turbine jets interfere with each other, but it should be understood that units A, B, C, may be placed in any manner so as not to cause undue interference. The angles of incidence for rotary wing flight or fixed wing flight of the several units in longitudinal sequence, may be different so as to increase efficiency.

Some of the means such as controls 90 are only diagrammatically shown as such controls for variable incidence in ordinary types of wings are well known, and they may be operated by any of the well known types of servo-motors with controls therefor, as commonly used.

In Fig. 12, a frontal view of an air craft, two units each designated A, are mounted at opposite sides of the fuselage or carrier body 87, on a pair of booms or short wings R and R¹, and turbines 85ª are mounted in these booms and may drive the units A as in the first form illustrated. The auxiliary or control wings are 88 as in Figures 10, 9, 8.

The booms or wings R and R¹ in Figure 12 may be placed at any angle to the horizontal or horizontally and may be of any relative length such that they may provide support for any number of units such as A, described, each a rotative or fixed wing unit. The wings R or R¹ would then be capable of giving some supplemental support to the aircraft in flight but at the same time would not be of such area, horizontally, as to interfere with the support given by the units A. When units are stationed as in Figures 8, 9, 10, it is contemplated that the aircraft or carrier body 87 would be relatively long in the direction of flight, so that there would be say, at least fifty feet between units A and B and also at least fifty feet between units B and C, so that these units are relatively independent of each other, but it is contemplated also that the units may be placed on different levels relative to the carrier body 87 so that efficiency of each unit would be improved or adequate. In other words it is contemplated that units may be placed in such a method or at such locations relative to a carrier body, that each unit would perform efficiently, and such location of units would vary according to the size and function of the aircraft and the design features and requirements of the aircraft.

While I have illustrated and described my invention as having the detailed elements as shown, I contemplate that other detailed elements and constructions may be utilized in the realization of my invention, without departing from the spirit and contemplation of my invention.

What I claim is:

1. In an air-craft, a supporting structure fixed on the air-craft, a rotor unit mounted on a substantially vertical axis on the supporting structure and comprising a hub structure having rotatable bearing on the supporting structure and a pair of air foil blades each having a mounting at its root end on the hub structure to be rotatable with the hub structure as a unit; each mounting of an air foil blade on the hub structure including a pivot in the mounting on which the blade is oscillatable on a substantially vertical axis, in a plane transversely of the axis of rotation of the rotor unit on the supporting structure, to a position in that plane such that the air foil blades so positioned are substantially equally and widely separated radially in the circle about the axis of rotation and alternatively to a position in that circle trailing from the said axis of rotation such that the air foil blades so positioned are closely adjacent each other trailing from the axis of rotation; each mounting of an air foil blade on the hub structure including also a pivot on which the air foil blade is oscillatable on a horizontal axis radially of the hub structure to positions of incidence in the widely separated positions such that each air foil blade provides upward lift when the rotor unit is rotated on the axis of rotation and alternatively to positions such that when the air foil blades are in the trailing positions closely adjacent each other each air foil blade has then that angle of incidence to provide upward lift on the air-craft when the rotor unit is relatively static.

2. In an air-craft, a supporting structure fixed on the air-craft, a rotor unit mounted on a substantially vertical axis on the supporting structure and comprising a hub structure having rotatable bearing on the supporting structure and a pair of air foil blades each having a mounting at its root end in the hub structure to be rotatable with the hub structure as a unit; each mounting of an air foil blade on the hub structure including a pivot in the mounting on which the air foil blade is oscillatable on a substantially vertical axis, in a plane transversely of the axis of rotation of the rotor unit on the supporting structure, to a position in that plane such that the air foil blades so positioned are substantially equally and widely separated radially in the circle about the axis of rotation and alternatively to a position in that circle trailing from the said axis of rotation such that the air foil blades so positioned are closely adjacent each other trailing from the axis of rotation; each mounting of an air foil blade on the hub structure including also a pivot on which the air foil blade is oscillatable on a horizontal axis radially of the hub structure to positions of incidence in the widely separated positions such that each air foil blade provides upward lift when the rotor unit is rotated on the axis of rotation and alternatively to positions such that when the air foil blades are in the trailing positions closely adjacent each other each air foil blade has then that angle of incidence to provide upward lift on the air-craft when the rotor unit is relatively static; and motor means mounted on the hub structure having torque applying means operatively interconnected with the air foil blades to effect the movement of the air foil blades into the equally and widely separated positions in the circle about said axis of rotation; and adjusting motor means having torque applying means operatively engaging the mountings of the air foil blades to effect oscillation of the air foil blades individually into the angles of incidence for upward lift in rotation of the rotor unit on the axis of rotation and alternatively into the angles of incidence for upward lift as a static wind unit when the air foil blades trail from the axis of rotation in the closely adjacent positions in said circle.

3. In an air-craft, a supporting structure fixed on the air-craft, a rotor unit mounted on a substantially vertical axis on the supporting structure and comprising a hub structure having rotatable bearing on the supporting structure and a pair of air foil blades each having a mounting at its root end on the hub structure to be rotatable with the hub structure as a unit; each mounting of an air foil blade including an anchoring shaft mounted in the hub structure to be oscillatable on a horizontal axis which is substantially a radius of the circle transversely of the axis of the hub structure and to be anchored in the hub structure; each mounting of an air foil blade including a pivot connecting the air foil blade and the anchoring shaft and on which the air foil blade is oscillatable on a substantially vertical axis, in the plane transversely of the axis of rotation of the rotor unit, to a position such that the air foil blade is widely separated from the other blade in the circle about the hub structure and alternatively to a position such that it trails from the said axis of rotation closely adjacent to the other blade; a cylinder and piston means having one member thereof fixed on the hub structure and the other member being reciprocable respective thereto and linked to each of said air foil blades to transmit torque of the reciprocable member upon the air foil blades to move them into their positions in the said transverse plane substantially equally and widely separated radially therein, and having controllable fluid supply means to effect delivery of fluid under pressure into said cylinder and to release fluid therefrom; another adjusting motor means having torque applying means operatively interconnected with the anchoring shafts of the air foil blades to effect opposite oscillation of the air foil blades on the anchoring shafts to positions such that when the air foil blades are in the widely separated positions each air foil blade will have that angle of incidence which provides upward lift in rotation of the rotor unit as a unit on the supporting structure and alternatively to effect oscillation of the air foil blades to positions of incidence in the closely adjacent trailing positions such that upward lift as a static unit is effected in the non-rotative condition of the rotor unit; and means to control the last named adjusting motor means to effect either of the alternative positioning operations.

4. In an air-craft, a supporting structure fixed on the air-craft, a rotor unit mounted on a substantially vertical axis on the supporting structure and comprising a hub structure having rotatable bearing on the supporting structure and a pair of air foil blades each having a mounting at its root end on the hub structure to be rotatable with the hub structure as a unit; each mounting of an air foil blade including an anchoring shaft mounted in the hub structure to be oscillatable on a horizontal axis which is substantially a radius of the circle transversely of the axis of the hub structure and to be anchored in the hub structure; each mounting of an air foil blade including a pivot between the air foil blade and the anchoring shaft to permit oscillation of the air foil blade on a substantially vertical axis, in the plane transversely of the axis of rotation of the rotor unit, to a position such that the air foil blade is widely separated from the other blade in the circle about the hub structure and alternatively to a position such that it trails from the said axis of rotation closely adjacent to the other blade; a cylinder and piston means having one member thereof fixed on the hub structure and the other member being reciprocable respective thereto and linked to each of said air foil blades to transmit torque of the reciprocable member upon the air foil blades to move them into their positions in the said transverse plane substantially equally and widely separated radially therein, and having controllable fluid supply means to effect delivery of fluid under pressure into said cylinder and to release fluid therefrom; an adjusting motor means for the air foil blades including; one motor secured on the hub structure and having a torque element operatively interconnected with the anchoring shaft of one air foil blade to effect oscillation of the associated air foil blade to a position such that when the air foil blades are in the widely separated positions the air foil blade will have that angle of incidence which provides upward lift in rotation of the rotor unit as a unit on the supporting structure and alternatively to effect oscillation of the associated air foil blade to a position of incidence in the closely adjacent trailing positions such that upward lift as a static unit is effected in the non-rotative condition of the rotor unit; and including one motor secured on the hub structure and having a torque applying element operatively interconnected with the anchoring shaft of the other air foil blade to effect oscillation of the associated air foil blade to a position such that when the air foil blades are in the widely separated positions the air foil blade will have that angle of incidence which provides upward lift in rotation of the rotor unit as a unit on the supporting structure and alternatively to effect oscillation of the associated air foil blade to a position of incidence in the closely adjacent trailing positions such that upward lift as a stastic unit is effected in the non-rotative condition of the rotor unit; and control means for the two motors last named to procure the operation of their torque applying elements to effect the alternative conditions designated.

5. In an air-craft, a supporting structure fixed on the air-craft, a rotor unit mounted on a substantially vertical axis on the supporting structure and comprising a hub structure having rotatable bearing on the supporting structure and a pair of air foil blades each having a mounting at its root end on the hub structure to be rotatable with the hub structure as a unit; each mounting of an air foil blade including an anchoring shaft mounted in the hub structure to be oscillatable on a horizontal axis which is substantially a radius of the circle transversely of the axis of the hub structure and to be anchored in the hub structure; each mounting of an air foil blade including a pivot in the mounting between the air foil blade and the anchoring shaft and on which the air foil blade is oscillatable on a substantially vertical axis, in the plane transversely of the axis of rotation of the rotor unit, to a position such that the air foil blade is widely separated from the other blade in the circle about the hub structure and alternatively to a position such that it trails from the said axis of rotation closely adjacent to the other blade; a cylinder and piston means having one member thereof fixed on the hub structure and the other member being reciprocable respective thereto and linked to each of said air foil blades to transmit torque of the reciprocable member upon the air foil blades to move them into their positions in the said transverse plane substantially equally and widely separated radially therein, and controllable fluid supply means to effect delivery of fluid under pressure into said cylinder and to release fluid therefrom; an adjusting means for the air foil blades including; a pair of bevel gears one fixed on the inner end of each anchoring shaft, a common bevel gear intermediately of the pair of bevel gears and in engagement on opposite sides with the pair of bevel gears, an adjusting motor carried with the rotor unit in rotation and having a torque applying element operatively interconnected with the common bevel gear, a control means for the adjusting motor to effect driving of the torque applying element in either direction, drive in one direction effecting oscillation of the pair of bevel gears and their interconnected air foil blades to positions of opposite incidence such that upward lift is effected when the rotor unit is rotated as a unit for sustentation, drive in the opposite direction effecting oscillation of the air foil blades to positions suitable for upward lift in the trailing positions.

6. A rotor supporting structure formed on an air-craft, a rotor hub structure rotatively mounted on the supporting structure, a plural number of air foil blades on the rotor hub; each air foil blade having an anchoring member which is oscillatable in a bearing therefor in the rotor hub structure on a horizontal axis and by which the air foil blade is anchored to the rotor hub structure for oscillation of the air foil blade on an axis radially of the hub structure; each of the air foil blades having a pivot connecting the air foil blade with its associated anchoring member and on which the air foil blade is oscillatable on a substantially vertical axis in the plane transversely of the axis of rotation: a motor mounted on the rotor hub structure and carried therewith in rotation and having a torque applying means and interconnecting linkage between the torque applying means and each of the air foil blades to move the blades on the last named pivots into positions in the said transverse plane so that the blades are substantially equi-distantly separated radially in said transverse plane; an adjusting motor means mounted on and carried with the rotor hub structure and having torque applying means and interconnecting linkage between the torque applying means and the anchoring members to effect oscillation of each of the air foil blades on the axes of the anchoring members; and control means for the first named motor and the last named motor means to procure in one condition the equi-distant separation of the air foil blades in the plane transversely of the axis of rotation and with each air foil blade in that angle of incidence to procure upward lift in rotation of the rotor hub structure and the air foil blades as a unit on the axis of rotation and to procure in an alternative condition close association in the said transverse plane of the air foil blades trailing radially from the axis of rotation and the angle of incidence in such trailing positions to procure upward lift of the air foil blades as a static unit.

7. A rotor supporting structure formed on an air-craft, a rotor hub structure rotatively mounted on the supporting structure, a plural number of air foil blades mounted on the rotor hub each air foil blade having an anchoring member which is oscillatable in the rotor hub structure on a horizontal axis and by which the air foil blade is anchored to the rotor hub structure for oscillation of the air foil blade on an axis radially of the hub structure, in the plane transversely of the axis of rotation of the rotor hub structure; each of the air foil blades having a pivot connecting the air foil blade with the associated anchoring member and on which the air foil blade is oscillatable on a substantially vertical axis in the plane transversely of the axis of rotation: a cylinder and piston means one member of which is fixed on the rotor hub structure and the other is linked to the air foil blades to forcibly move the air foil blades on the last named pivots into the positions in the plane transversely of the axis of rotation substantially equi-distantly separated in the circle about the said axis of rotation the air foil blades having unrestricted movement in the opposite direction of oscillation when fluid exhausts from the cylinder to move into closely associated positions trailing radially from the said axis of rotation; each anchoring member having a gear fixed on and oscillatable with it; individual incidence changing means for the air foil blades comprising an adjusting motor for each air foil blade, each adjusting motor comprising an electro-magnetically operated armature rotatably interconnected through gearing with the first named gear to drive it and its anchoring member in either direction; a controllable fluid supply under pressure to deliver fluid under pressure to the said cylinder or to release fluid therefrom; a supply of electric operating current to each adjusting motor and a control for each of said adjusting motors to procure in one condition, when the air foil blades are in the equi-distantly separated positions radially in the transverse plane, individual oscillation of each said anchoring member and its air foil blade on the said horizontal axis to the angle of incidence to provide upward lift of the air foil blade in rotation of the rotor hub structure and the air foil blades as a unit on the axis of rotation, and to procure in the condition, when the air foil blades are in the closely associated radial positions trailing from the axis of rotation, individual oscillation of each said anchoring member and its air foil blade on the said horizontal axis to the angle of incidence of the air foil blade in the trailing position to procure upward lift of the air foil blades as a non-rotating relatively static unit.

8. All of the means as described and as claimed in claim 5 and in combination: each mounting of an air foil blade including a second pivot connecting the air foil blade through the first named pivot to the anchoring shaft and on which, when the air foil blades are in the trailing closely adjacent positions, there may be oscillation of the air foil blades on horizontal axes into similar positions of incidence in their positions trailing from the axis of rotation, such that the air foil blades as a static unit provide upward lift in the non-rotative trailing condition; a lever means for each air foil blade by which it may be moved about the last named horizontal axis downwardly, another adjusting motor having a motor operated interengaging element actuated by the adjusting motor and interengageable with the last named lever means of the air foil blades to effect the oscillation to the angles of incidence for upward lift in the non-rotative static condition of the rotor unit.

ADOLPHE C. PETERSON.

References Cited in the file of this patent

UNITED STATES PATENTS

| Number | Name | Date |
|---|---|---|
| 1,503,950 | Heywood | Aug. 5, 1924 |
| 1,550,106 | Shaw | Aug. 18, 1925 |
| 1,721,450 | Hooper | July 16, 1929 |
| 1,823,417 | Weber | Sept. 15, 1931 |
| 2,385,464 | Peterson | Sept. 25, 1945 |
| 2,518,008 | Herrick | Aug. 8, 1950 |
| 2,544,497 | Herrick | Mar. 6, 1951 |